US009460683B2

(12) United States Patent
Jeong et al.

(10) Patent No.: US 9,460,683 B2
(45) Date of Patent: Oct. 4, 2016

(54) METHOD OF DRIVING DISPLAY PANEL USING POLARITY INVERSION AND DISPLAY APPARATUS FOR PERFORMING THE SAME

(71) Applicant: Samsung Display Co., Ltd., Yongin, Gyeonggi-do (KR)

(72) Inventors: Jae-Won Jeong, Seoul (KR); Kwan-Young Oh, Seoul (KR); Po-Yun Park, Asan-si (KR); Youn-Jin Jung, Daejeon (KR); Jung-Hwan Cho, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 656 days.

(21) Appl. No.: 13/680,727

(22) Filed: Nov. 19, 2012

(65) Prior Publication Data

US 2013/0135267 A1 May 30, 2013

(30) Foreign Application Priority Data

Nov. 24, 2011 (KR) ........................ 10-2011-0123737

(51) Int. Cl.
*G06F 3/038* (2013.01)
*G09G 5/00* (2006.01)
*G09G 3/36* (2006.01)

(52) U.S. Cl.
CPC .............. *G09G 5/00* (2013.01); *G09G 3/3614* (2013.01); *G09G 3/3648* (2013.01); *G09G 3/3688* (2013.01); *G09G 2300/0426* (2013.01); *G09G 2310/0218* (2013.01); *G09G 2320/0233* (2013.01); *G09G 2320/0247* (2013.01)

(58) Field of Classification Search
CPC ...... G09G 2310/08; G09G 5/00; G09G 3/18; G09G 3/30; G09G 3/36; G06F 3/038
USPC .................................................... 345/99, 100
See application file for complete search history.

(56) References Cited

U.S. PATENT DOCUMENTS

| | | | | |
|---|---|---|---|---|
| 7,714,823 | B2 * | 5/2010 | Chen et al. | 345/87 |
| 7,746,334 | B2 | 6/2010 | Lee et al. | |
| 2006/0028426 | A1 | 2/2006 | Hiratsuka | |
| 2008/0001870 | A1 * | 1/2008 | Lee | 345/87 |
| 2009/0033590 | A1 * | 2/2009 | Feng | 345/58 |
| 2010/0207918 | A1 * | 8/2010 | Lee et al. | 345/209 |

FOREIGN PATENT DOCUMENTS

| | | |
|---|---|---|
| KR | 1020050000644 | 1/2005 |
| KR | 1020080088141 | 10/2008 |

* cited by examiner

*Primary Examiner* — Pegeman Karimi
(74) *Attorney, Agent, or Firm* — F. Chau & Associates, LLC

(57) ABSTRACT

A display apparatus includes a display panel, a data driving part, and a timing control part. The display panel includes gate lines extending in a first direction, data lines extending in a second direction crossing the first direction, and first and second pixel groups. The first and second pixel groups are disposed at opposing sides of a data line and are alternately connected to the data line. The data driving part includes channels connected to the data lines. The channels output a data signal to the data lines, the data signal has a first polarity or a second polarity, and the second polarity has an inversed phase to the first polarity. The timing control part outputs a data inverse control signal and first and second polarity control signal, which control the polarity of the data signal based on the data inverse control signal.

24 Claims, 11 Drawing Sheets

| DINV | | + | − |
|---|---|---|---|
| POL1,POL2 | 0 | − | + |
| | 1 | + | − |

FIG. 5A

| DATA INTEGRATED CIRCUIT OUTPUT CHANNEL | | 1 | 2 | 3 | 4 | 5 | 6 | ··· |
|---|---|---|---|---|---|---|---|---|
| DINV | | + | − | + | − | + | − | ··· |
| POL1 | 0 | − | | − | | − | | ··· |
| | 0 | − | | − | | − | | |
| | 0 | − | | − | | − | | |
| | 0 | − | | − | | − | | |
| ⋮ | | | | | | | | |

FIG. 5B

| DATA INTEGRATED CIRCUIT OUTPUT CHANNEL | | 1 | 2 | 3 | 4 | 5 | 6 | ··· |
|---|---|---|---|---|---|---|---|---|
| DINV | | + | − | + | − | + | − | ··· |
| POL2 | 0 | | + | | + | | + | ··· |
| | 0 | | + | | + | | + | |
| | 0 | | + | | + | | + | |
| | 0 | | + | | + | | + | |
| ⋮ | | | | | | | | |

| DATA INTEGRATED CIRCUIT OUTPUT CHANNEL | | 1 | 2 | 3 | 4 | 5 | 6 | 7 | ··· |
|---|---|---|---|---|---|---|---|---|---|
| DINV | | + | − | − | + | + | − | − | ··· |
| POL1 | 0 | − | | + | | − | | + | ··· |
| | 0 | − | | + | | − | | + | |
| | 1 | + | | − | | + | | − | |
| | 1 | + | | − | | + | | − | |
| | 0 | − | | + | | − | | + | |
| | 0 | − | | + | | − | | + | |
| | 1 | + | | − | | + | | − | |
| | 1 | + | | − | | + | | − | |
| | ⋮ | | | | | | | | |

FIG. 6B

| DATA INTEGRATED CIRCUIT OUTPUT CHANNEL | | 1 | 2 | 3 | 4 | 5 | 6 | 7 | … |
|---|---|---|---|---|---|---|---|---|---|
| DINV | | + | − | − | + | + | − | − | … |
| POL2 | 1 | | − | | + | | − | | … |
| | 1 | | − | | + | | − | | |
| | 1 | | − | | + | | − | | |
| | 1 | | − | | + | | − | | |
| | 1 | | − | | + | | − | | |
| | 1 | | − | | + | | − | | |
| | 1 | | − | | + | | − | | |
| | 1 | | − | | + | | − | | |
| | ⋮ | | | | | | | | |

| DATA INTEGRATED CIRCUIT OUTPUT CHANNEL | | 1 | 2 | 3 | 4 | 5 | 6 | 7 | ... |
|---|---|---|---|---|---|---|---|---|---|
| DINV | | + | − | − | + | + | − | − | ... |
| POL1 | 0 | − | | + | | − | | + | ... |
| | 0 | − | | + | | − | | + | |
| | 0 | − | | + | | − | | + | |
| | 0 | − | | + | | − | | + | |
| | 1 | + | | − | | + | | − | |
| | 1 | + | | − | | + | | − | |
| | 1 | + | | − | | + | | − | |
| | 1 | + | | − | | + | | − | |
| | ⋮ | | | | | | | | |

FIG. 7B

| DATA INTEGRATED CIRCUIT OUTPUT CHANNEL | | 1 | 2 | 3 | 4 | 5 | 6 | 7 | … |
|---|---|---|---|---|---|---|---|---|---|
| DINV | | + | − | − | + | + | − | − | … |
| POL2 | 1 | | − | | + | | − | | … |
| | 1 | | − | | + | | − | | |
| | 0 | | + | | − | | + | | |
| | 0 | | + | | − | | + | | |
| | 0 | | + | | − | | + | | |
| | 0 | | + | | − | | + | | |
| | 1 | | − | | + | | − | | |
| | 1 | | − | | + | | − | | |
| | ⋮ | | | | | | | | |

| DATA INTEGRATED CIRCUIT OUTPUT CHANNEL | | 1 | 2 | 3 | 4 | 5 | 6 | ... |
|---|---|---|---|---|---|---|---|---|
| DINV | | + | − | + | − | + | − | ... |
| POL1 | 0 | − | | − | | − | | ... |
| | 0 | − | | − | | − | | |
| | 0 | − | | − | | − | | |
| | 0 | − | | − | | − | | |
| ⋮ | | | | | | | | |

| DATA INTEGRATED CIRCUIT OUTPUT CHANNEL | | 1 | 2 | 3 | 4 | 5 | 6 | ··· |
|---|---|---|---|---|---|---|---|---|
| DINV | | + | − | + | − | + | − | ··· |
| POL2 | 0 | | + | | + | | + | ··· |
| | 0 | | + | | + | | + | |
| | 0 | | + | | + | | + | |
| | 0 | | + | | + | | + | |
| ⋮ | | | | | | | | |

METHOD OF DRIVING DISPLAY PANEL USING POLARITY INVERSION AND DISPLAY APPARATUS FOR PERFORMING THE SAME

CROSS-REFERENCE TO RELATED APPLICATIONS

This application claims priority under 35 U.S.C. §119 to Korean Patent Application No. 10-2011-0123737, filed on Nov. 24, 2011, the disclosure of which is incorporated by reference herein in its entirety.

TECHNICAL FIELD

Exemplary embodiments of the present invention relate to a method of driving a display panel, and a display apparatus for performing the method of driving the display panel. More particularly, exemplary embodiments of the present invention relate to a method of driving a display panel and a display apparatus that utilize a data signal having certain polarities.

DISCUSSION OF RELATED ART

A display apparatus may be driven by an inversion driving method such as, for example, a dot polarity inversion method, a column inversion method, or a frame inversion method. When utilizing a dot polarity inversion driving method, the polarity of pixels is inversed every several pixels. However, utilization of a dot polarity inversion driving method may result in flicker, crosstalk, or a vertical line phenomenon on the display apparatus, thus decreasing the quality of a displayed image.

SUMMARY

According to an exemplary embodiment of the present invention, a display apparatus includes a display panel, a gate driving part, a data driving part and a timing control part. The display panel includes a gate line, a data line extending in a different direction from the gate line, and first and second pixel groups disposed at both sides with respect to the data line, and alternately connected to the data line. The gate driving part outputs a gate signal to the gate line. The data driving part includes a plurality of channels electrically connected to the data lines and outputs a data signal having a first polarity or a second polarity to the data line. The second polarity has an inversed phase to the first polarity with respect to a reference voltage. The timing control part outputs a data inverse control signal, a first polarity control signal and a second polarity control signal. The data inverse control signal has a phase in every data line. The first polarity control signal controls a polarity of the data signal applied to an odd-numbered channel of the data driving part. The second polarity control signal controls a polarity of the data signal applied to an even-numbered channel of the data driving part. The first and second polarity control signal control the polarity of the data signal based on the data inverse control signal.

In an exemplary embodiment, the driving part may include a first polarity controller and a second polarity controller. The first polarity controller may control the polarity of the data signal outputted to the odd-numbered channel of the data driving part. The first polarity controller may control the polarity of the data signal based on the phase of the data inverse control signal and a first logic level of the first polarity control signal. The second polarity controller may control the polarity of the data signal outputted to the even-numbered channel of the data driving part. The second polarity controller may control the polarity of the data signal based on the phase of the data inverse control signal and a second logic level of the second polarity control signal.

In an exemplary embodiment, the data inverse control signal may be a first phase, and the first polarity controller and the second polarity controller may determine the polarity of the data signal as a first polarity when the first logic level of the first polarity control signal and the second logic level of the second polarity control signal are a first level, and the polarity of the data signal as a second polarity different from the first polarity when the first logic level of the first polarity control signal and the second logic level of the second polarity control signal are a second level.

In an exemplary embodiment, the data inverse control signal may be a second phase different from the first phase, and the first polarity controller and the second polarity controller may determine the polarity of the data signal as the second polarity when the first logic level of the first polarity control signal and the second logic level of the second polarity control signal are the first level, and the polarity of the data signal as the first polarity when the first logic level of the first polarity control signal and the second logic level of the second polarity control signal are the second level.

In an exemplary embodiment, the first phase may be a positive phase, the second phase may be a negative phase, the first level may be a low level, the second level may be a high level, the first polarity may be a negative polarity, and the second polarity may be a positive polarity.

In an exemplary embodiment, each of the first polarity control signal and the second polarity control signal may have a plurality of bits.

In an exemplary embodiment, the phase of the data inverse control signal may be inversed every two data lines.

In an exemplary embodiment, the phase of the data inverse control signal may be inversed every data line.

In an exemplary embodiment, pixels of the first and second pixel groups disposed in a horizontal direction substantially parallel with the gate line may be inversely driven every four pixels, and the pixels disposed in a vertical direction substantially parallel with the data line may be inversely driven every pixel.

In an exemplary embodiment, pixels of the first and second pixel groups disposed in a horizontal direction substantially parallel with the gate line may be inversely driven every four pixels, and the pixels disposed in a vertical direction substantially parallel with the data line may be inversely driven every two pixels.

In an exemplary embodiment, each of the first pixel group and the second pixel group may include two pixels arranged in a horizontal direction substantially parallel with the gate line.

In an exemplary embodiment, each of the first pixel group and the second pixel group may include one pixel.

In an exemplary embodiment, the timing control part may determine a defect pattern based on a polarity pattern of pixels of the first and second pixel groups.

In an exemplary embodiment, the timing control part may determine a pattern of the pixels as the defect pattern when polarities of the pixels having an on-state are substantially the same and polarities of the pixels having an off-state are substantially the same.

In an exemplary embodiment, the timing control part may determine a pattern of the pixels as the defect pattern when polarities of the pixels adjacent to each other in a direction substantially parallel with the gate line are substantially the same, and the same polarities of the pixels adjacent to each other in the direction substantially parallel with the gate line are repeated in a direction substantially parallel with the data line.

In an exemplary embodiment, the timing control part determines the polarity pattern of the pixels as the defect pattern, and the timing control part may change at least one selected from the group consisting of the phase of the data inverse control signal, the first logic level of the first polarity control signal and the second logic level of the second polarity control signal.

According to an exemplary embodiment of the present invention, a data inverse control signal is outputted to a data driving part of a display apparatus, a first polarity control signal is outputted based on the data inverse control signal, and a second polarity control signal is outputted based on the data inverse control signal. The data signal is outputted to the data line based on the data inverse control signal. The data signal has a first polarity or a second polarity. The first polarity control signal controls a polarity of a data signal outputted to an odd-numbered channel of a data driving part. The second polarity control signal controls a polarity of the data signal outputted to an even-numbered channel of the data driving part. The display panel includes a gate line, a data line extending in a direction different from the gate line, and a first pixel group and a second pixel group. The first and second pixel groups are disposed at both sides with respect to the data line, and alternately connect to the data line. The second polarity has an inversed phase to the first polarity with respect to a reference voltage.

In an exemplary embodiment, the data signal may be outputted by controlling the polarity of the data signal outputted to the odd-numbered channel of the data driving part. The data signal is outputted to the odd-numbered channel based on the phase of the data inverse control signal and a first logic level of the first polarity control signal. The data signal is outputted to the even-numbered channel based on the phase of the data inverse control signal and a second logic level of the second polarity control signal.

In an exemplary embodiment, a defect pattern may be determined based on a polarity pattern of a plurality of the pixels.

In an exemplary embodiment, at least one selected from the group consisting of the phase of the data inverse control signal, the first logic level of the first polarity control signal, and the second logic level of the second polarity control signal may be changed when the polarity pattern of the pixels is determined as the defect pattern.

According to an exemplary embodiment of the present invention, a display apparatus includes a display panel, a gate driving part, a data driving part, and a time control part. The display panel includes a plurality of gate lines extending in a first direction, a plurality of data lines extending in a second direction crossing the first direction, a first pixel group, and a second pixel group. The first and second pixel groups are disposed at opposing sides of one of the data lines and are alternately connected to the one of the data lines. The gate driving part is configured to output a gate signal to the gate lines. The data driving part includes a plurality of channels electrically connected to the data lines. The plurality of channels are configured to output a data signal to the data lines, the data signal has a first polarity or a second polarity, and the second polarity has an inversed phase to the first polarity with respect to a reference voltage. The timing control part is configured to output a data inverse control signal, a first polarity control signal, and a second polarity control signal. The first and second polarity control signals control the polarity of the data signal based on the data inverse control signal.

According to an exemplary embodiment of the present invention, a method of driving a display panel includes outputting a data inverse control signal, a first polarity control signal, and a second polarity control signal to a data driving part of a display apparatus. The first and second polarity control signals are based on the data inverse control signal, the first polarity control signal controls a polarity of a data signal outputted to an odd-numbered channel of the data driving part, and the second polarity control signal controls a polarity of the data signal outputted to an even-numbered channel of the data driving part. The method further includes outputting the data signal to a data line of the display apparatus based on the data inverse control signal, the first polarity control signal and the second polarity control signal. The data signal has a first polarity or a second polarity, and the second polarity has an inversed phase to the first polarity with respect to a reference voltage.

According to an exemplary embodiment of the present invention, a display apparatus includes a timing control part and a data driving part. The timing control part is configured to output a data inverse control signal, a first polarity control signal, and a second polarity control signal. The data driving part is configured to receive the data inverse control signal, the first polarity control signal, and the second polarity control signal, and output a data signal to a plurality of data lines in the display apparatus. The first and second polarity control signals control the polarity of the data signal based on the data inverse control signal.

According to exemplary embodiments of the present invention, a timing control part determines a defect pattern based on a polarity pattern of pixels, and the display panel is driven according to a data inverse control signal, a first polarity control signal and a second polarity control signal. The data inverse control signal, the first polarity control signal and the second polarity control signal may be changed by the timing control part. As a result, crosstalk, flicker or a vertical line phenomenon displayed by the display panel may be decreased. Therefore, the quality of an image displayed on the display apparatus may be improved.

BRIEF DESCRIPTION OF THE DRAWINGS

The above and other features of the present invention will become more apparent by describing in detail exemplary embodiments thereof with reference to the accompanying drawings, in which:

FIGS. 5A and 5B are conceptual views illustrating a method of driving a display panel, according to an exemplary embodiment of the present invention;

FIG. 5C is a plan view illustrating a display panel driven by the method of FIGS. 5A and 5B, according to an exemplary embodiment of the present invention;

FIGS. 6A and 6B are conceptual views illustrating a method of driving a display panel according to an exemplary embodiment of the present invention;

FIG. 6C is a plan view illustrating a display panel driven by the method of FIGS. 6A and 6B, according to an exemplary embodiment of the present invention;

FIGS. 7A and 7B are conceptual views illustrating a method of driving a display panel according to an exemplary embodiment of the present invention;

DETAILED DESCRIPTION

Figure 1:
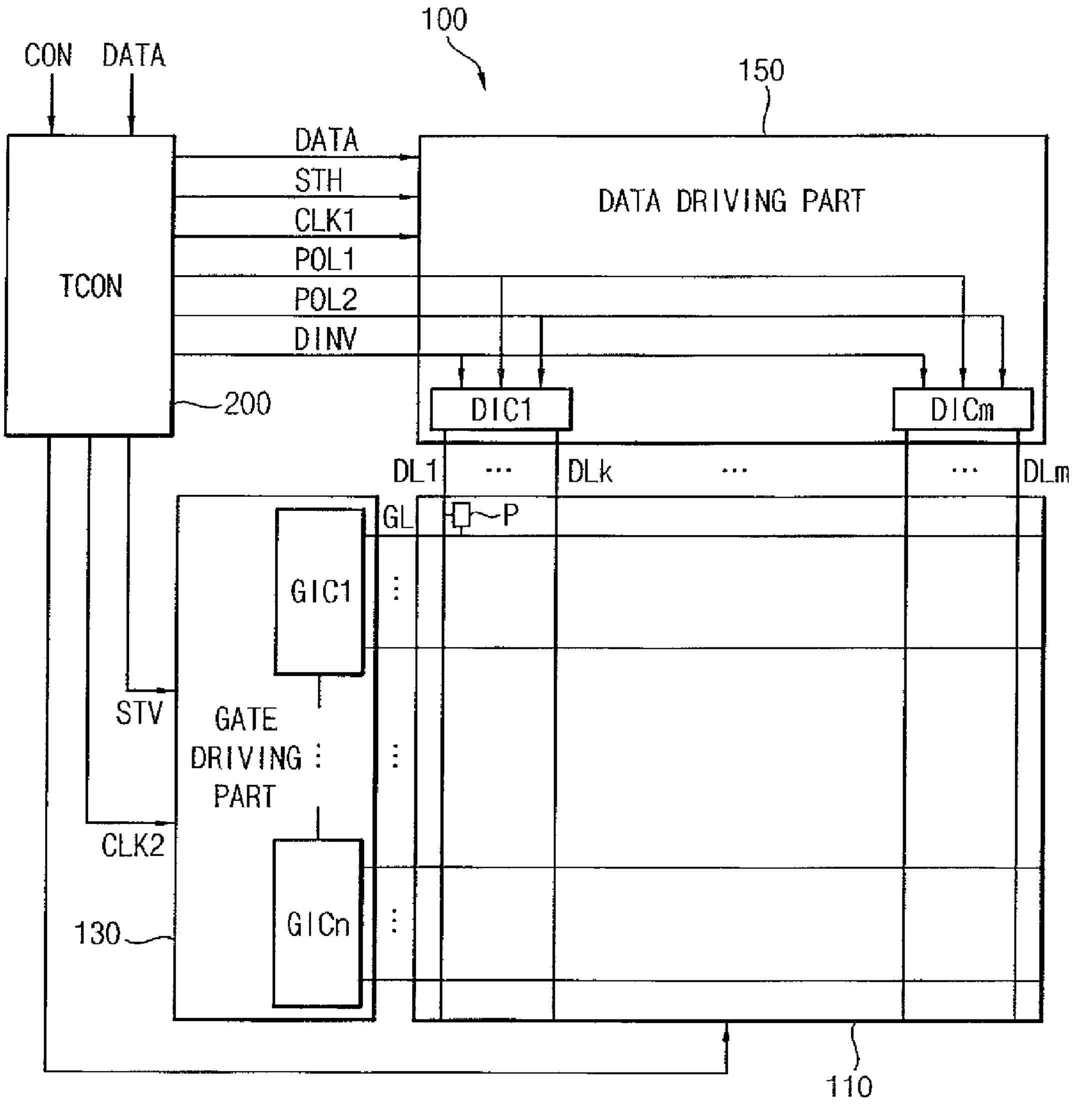
FIG. 1 is a block diagram illustrating a display apparatus according to an exemplary embodiment of the present invention.

Exemplary embodiments of the present invention will be described more fully hereinafter with reference to the accompanying drawings. Like reference numerals may refer to like elements throughout the accompanying drawings.

FIG. 1 is a block diagram illustrating a display apparatus according to an exemplary embodiment of the present invention.

Referring to FIG. 1, the display apparatus 100 according to an exemplary embodiment includes a display panel 110, a gate driving part 130, a data driving part 150 and a timing control part 200.

The display panel 110 includes a plurality of gate lines GL, a plurality of data lines DL1, . . . , DLk, . . . , DLm extending in a direction crossing the gate lines GL, and a plurality of pixels P connected to the gate lines GL and the data lines DL1, . . . , DLk, . . . , DLm.

The timing control part 200 receives image data DATA and a control signal CON from an external device. The control signal CON may include a horizontal synchronous signal Hsync, a vertical synchronous signal Vsync and a clock signal.

The timing control part 200 generates a data start signal STH based on the horizontal synchronous signal Hsync and outputs the data start signal STH to the data driving part 150. The timing control part 200 also generates a gate start signal STV based on the vertical synchronous signal Vsync and outputs the gate start signal STV to the gate driving part 130. In addition, the timing control part 200 generates a first clock signal CLK1 and a second clock signal CLK2 based on the clock signal, and outputs the first and second clock signals CLK1 and CLK2 to the data driving part 150 and the gate driving part 130, respectively In addition, the timing control part 200 outputs the image data DATA to the data driving part 150.

In addition, the timing control part 200 outputs a data inverse control signal DINV, a first polarity control signal POL1, and a second polarity control signal POL2. The first and second polarity control signals POL1 and POL2 control polarities of data signals based on the data inverse control signal DINV. The data inverse control signal DINV has a phase, and the phase may be different for every data line DL.

The data driving part 150 includes a plurality of data driving integrated circuits DIC1, . . . , DICm, and outputs the data signals based on the image data DATA to the data lines DL1, . . . , DLk, . . . , DLm, in response to the first clock signal CLK1 and the data start signal STH. The first clock signal CLK1 and the data start signal STH are provided by the timing control part 200. The data signals may have a first polarity and a second polarity inversed to the first polarity with respect to a reference voltage.

Each of the data driving integrated circuits DIC1, . . . , DICm controls the polarities of the data signals based on the data inverse control signal DINV, the first polarity control signal POL1, and the second polarity control signal POL2 provided by the timing control part 200. For example, each of the data driving integrated circuits DIC1, . . . , DICm may have a plurality of channels respectively connected to the data lines DL1, . . . , DLk, . . . , DLm. The data driving integrated circuits DIC1, . . . , DICm may determine polarities of the data signals outputted to odd-numbered channels based on the data inverse control signal DINV and the first polarity control signal POL1, and may determine polarities of the data signals outputted to even-numbered channels based on the data inverse control signal DINV and the second polarity control signal POL2.

The gate driving part 130 includes a plurality of gate driving integrated circuits GIC1, . . . , GICn. The gate driving part 130 generates gate signals using the second clock signal CLK2 and the gate start signal STV, and outputs the gate signals to the gate lines GL. The second clock signal CLK2 and the gate start signal STV are provided by the timing control part 200.

Figure 2:
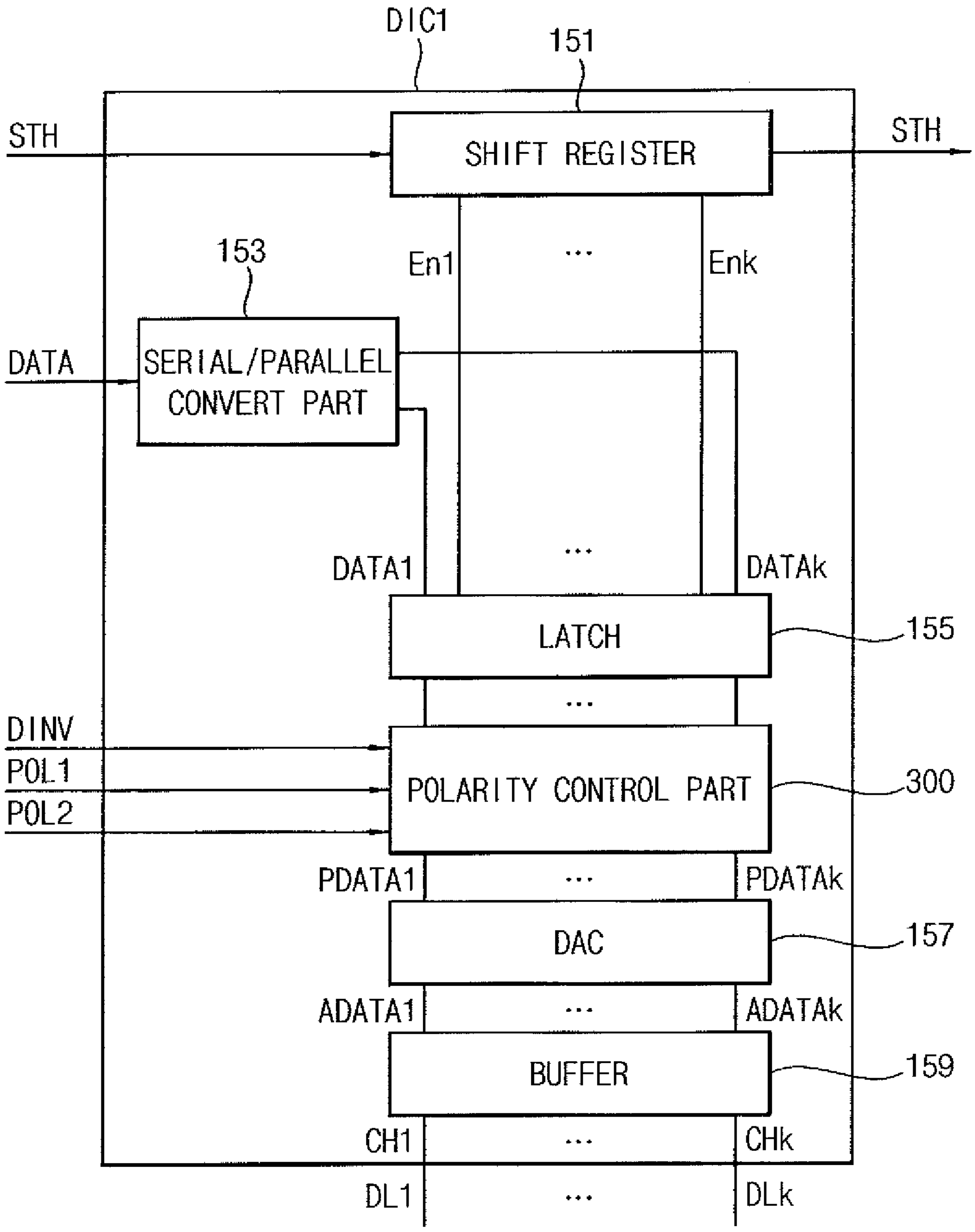
FIG. 2 is a block diagram illustrating an exemplary embodiment of a data driving integrated circuit of FIG. 1.

FIG. 2 is a block diagram illustrating an exemplary embodiment of the data driving integrated circuit DIC1 of FIG. 1.

Referring to FIGS. 1 and 2, the data driving integrated circuit DIC1 includes a shift register 151, a serial-to-parallel convert part 153, a latch 155, a polarity control part 300, a digital-to-analog convert part 157, and a buffer 159.

The serial-to-parallel convert part 153 receives the image data DATA. The serial-to-parallel convert part 153 converts the image data DATA to parallel data DATA1, . . . , DATAk. The serial-to-parallel convert part 153 outputs the parallel data DATA1, . . . , DATAk to the latch 155.

The shift register 151 shifts the data start signal STH, and sequentially applies the parallel data DATA1, . . . , DATAk to the latch 155. For example, the shift register 151 sequentially outputs enable signals En1, . . . , Enk in an order from the first enable signal En1 to the last enable signal Enk. Thus, the latch 155 sequentially stores the parallel data DATA1, . . . , DATAk in an order from the first parallel data DATA1 to the last parallel data DATAk.

The latch 155 outputs the parallel data DATA1, . . . , DATAk to the polarity control part 300.

The polarity control part 300 controls polarities of the parallel data DATA1, . . . , DATAk based on the data inverse control signal DINV, the first polarity control signal POL1, and the second polarity control signal POL2, and generates polarity data PDATA1, . . . , PDATAk. The polarity control part 300 outputs the polarity data PDATA1, PDATAk to the digital-to-analog convert part 157.

The digital-to-analog convert part 157 converts the polarity data PDATA1, . . . , PDATAk received from the polarity control part 300 to analog data ADATA1, . . . , ADATAk. The digital-to-analog convert part 157 outputs the analog data ADATA1, . . . , ADATAk to the buffer 159.

The buffer 159 outputs the analog data ADATA1, . . . , ADATAk to the channels CH1, . . . , CHk, and the analog data ADATA1, . . . , ADATAk is applied to the data lines DL1, . . . , DLk of the display panel 110 through the channels CH1, . . . , CHk.

Figures 3, 4:
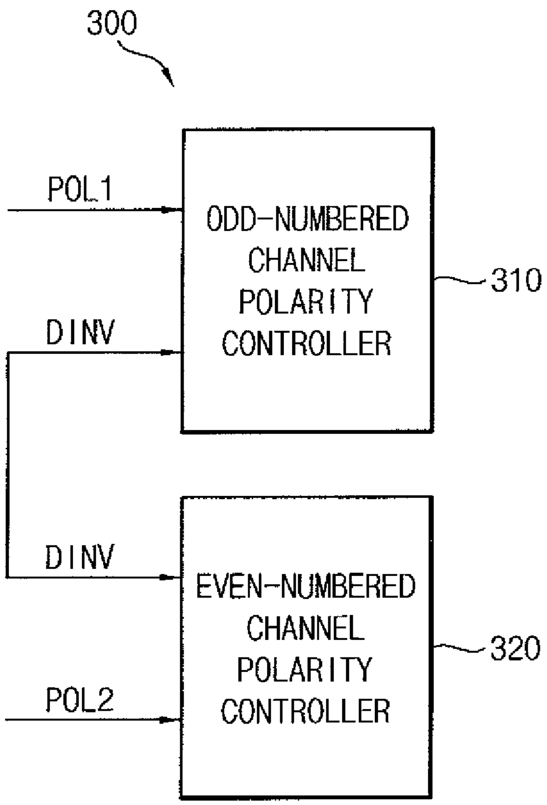
FIG. 3 is a block diagram illustrating an exemplary embodiment of a polarity control part of FIG. 2.
FIG. 4 is a conceptual view illustrating a method of determining polarities of data signals by a polarity control part of FIG. 2, according to an exemplary embodiment of the present invention.

FIG. 3 is a block diagram illustrating an exemplary embodiment of the polarity control part 300 of FIG. 2.

Referring to FIGS. 1 to 3, the polarity control part 300 includes a first polarity controller 310 and a second polarity controller 320.

The first polarity controller 310 controls the polarities of the parallel data DATA1, . . . , DATAk corresponding to the odd-numbered channels among the channels CH1, . . . , CHk. The first polarity controller 310 controls the polarities of the parallel data DATA1, . . . , DATAk based on the data inverse control signal DINV and the first polarity control signal POL1 provided by the timing control part 200. For example, the first polarity controller 310 may determine the polarities of the parallel data DATA1, . . . , DATAk corresponding to the odd-numbered channels based on the phase of the data inverse control signal DINV and a logic level of the first polarity control signal POLL Thus, the first polarity controller 310 may determine the polarities of the data signals outputted to the odd-numbered channels among the channels CH1, . . . , CHk.

The second polarity controller 320 controls the polarities of the parallel data DATA1, . . . , DATAk corresponding to the even-numbered channels among the channels CH1, . . . , CHk. The second polarity controller 320 controls the polarities of the parallel data DATA1, . . . , DATAk based on the data inverse control signal DINV and the second polarity control signal POL2 provided by the timing control part 200. For example, the second polarity controller 320 may determine the polarities of the parallel data DATA1, . . . , DATAk corresponding to the even-numbered channels based on the phase of the data inverse control signal DINV and a logic level of the second polarity control signal POL2. Thus, the second polarity controller 320 may determine the polarities of the data signals outputted to the even-numbered channels among the channels CH1, . . . , CHk.

FIG. 4 is a conceptual view illustrating a method of determining the polarities of the data signals by the polarity control part 300 of FIG. 2, according to an exemplary embodiment of the present invention.

Referring to FIGS. 1 to 4, the polarities of the data signals are determined according to the phase of the data inverse control signal DINV, the logic level of the first polarity control signal POL1, and the logic level of the second polarity control signal POL2.

For example, as shown in FIG. 4, when the data inverse control signal DINV has a first phase (e.g. a positive (+) phase), and the first polarity control signal POL1 and the second polarity control signal POL2 have a first logic level (e.g., logic level 0), the data signal may have a first polarity (e.g., a negative (−) polarity). When the first polarity control signal POL1 and the second polarity control signal POL2 have a second, different logic level (e.g., logic level 1), the data signal may have a second polarity different from the first polarity (e.g., a positive (+) polarity).

In addition, as shown in FIG. 4, when the data inverse control signal DINV has a second phase different from the first phase (e.g., a negative (−) phase), and the first polarity control signal POL1 and the second polarity control signal POL2 have the first logic level as described above (e.g., logic level 0), the data signal may have the second polarity as described above (e.g., a positive (+) polarity).

Alternatively, when the data inverse control signal DINV has the second phase (e.g., a negative (−) phase), and the first polarity control signal POL1 and the second polarity control signal POL2 have the second logic level as described above (e.g., logic level 1), the data signal may have the first polarity as described above (e.g., a negative (−) polarity).

In the example given above, the first phase is a positive (+) phase, the second phase is a negative (−) phase, the first logic level is a low logic level, the second logic level is a high logic level, the first polarity is a negative (−) polarity, and the second polarity is a positive (+) polarity, however the exemplary embodiments of the present invention are not limited thereto.

Figures 5C, 6A:
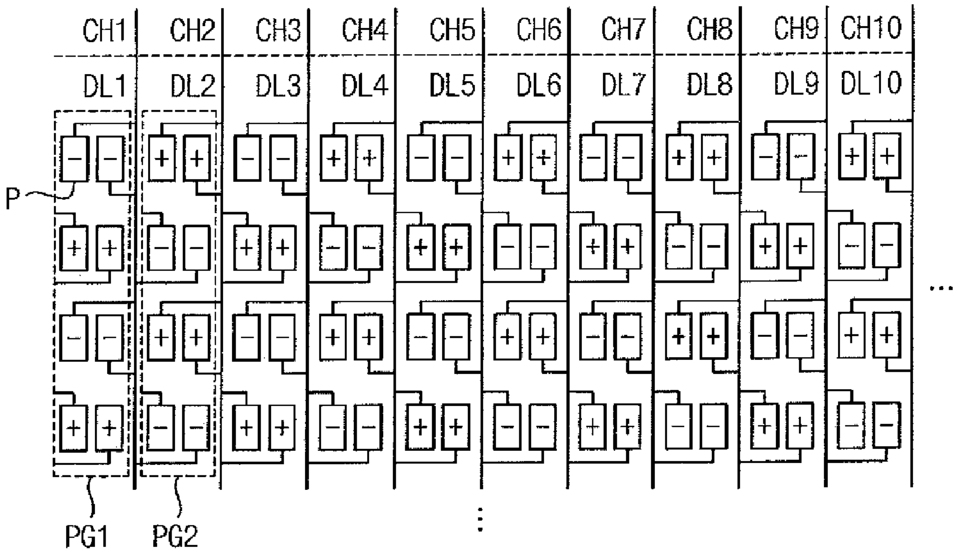

FIGS. 5A and 5B are conceptual views illustrating a method of driving a display panel according to an exemplary embodiment of the present invention. FIG. 5C is a plan view illustrating a display panel driven by the method of FIGS. 5A and 5B, according to an exemplary embodiment of the present invention.

The method of driving the display panel as shown in FIGS. 5A to 5B may be implemented using the display apparatus 100 of FIG. 1.

Referring to FIGS. 1 to 5, the data inverse control signal DINV corresponding to the channels CH1, . . . , CHk in the data driving part 150 has a phase. For example, the phase of the data inverse control signal DINV may be inversed for each consecutive channel. Thus, the data inverse control signal DINV may alternate between a positive (+) phase and a negative (−) phase for each data line DL among the data lines DL1, . . . , DLk, . . . , DLm.

The first polarity control signal POL1 determines the polarities of the data signals outputted to the odd-numbered channels among the channels CH1, . . . , CHk. The first polarity control signal POL1 includes a plurality of bits, and each of the bits has a low logic level (0) or a high logic level (1). For example, based on the plurality of bits, the first polarity control signal POL1 may have a value of '0000 . . . '

The second polarity control signal POL2 determines the polarities of the data signals outputted to the even-numbered channels among the channels CH1, . . . , CHk. The second polarity control signal POL2 includes a plurality of bits, and each of the bits has a low logic level (0) or a high logic level (1). For example, based on the plurality of bits, the second polarity control signal POL2 may have a value of '0000 . . . '.

As described with reference to FIG. 4, when the data inverse control signal DINV has a positive (+) phase and the first polarity control signal POL1 has a low logic level (0), the data signal may have a negative (−) polarity. In addition, when the data inverse control signal DINV has a negative (−) phase and the second polarity control signal POL2 has a low logic level (0), the data signal may have a positive (+) polarity.

Thus, as shown in FIG. 5A, data signals having polarities of '(−)(−)(−)(−) . . . ' are outputted to the odd-numbered channels among the channels CH1, . . . , CHk. The data signals having polarities of '(−)(−)(−)(−) . . . ' are sequentially applied to the pixels P through odd-numbered data lines respectively connected to the odd-numbered channels.

In addition, as shown in FIG. 5B, data signals having polarities of '(+)(+)(+)(+) . . . ' are outputted to the even-numbered channels among the channels CH1, . . . , CHk. The data signals having polarities of '(+)(+)(+)(+) . . . ' are sequentially applied to the pixels P through even-numbered data lines respectively connected to the even-numbered channels.

The pixels P may have a first pixel group PG1 and a second pixel group PG2 disposed at opposing sides with respect to a data line DL from among the data lines DL1, . . . , DLk, . . . , DLm, and may be alternately connected to the data line DL. In addition, each of the first pixel group PG1 and the second pixel group PG2 may have, for example, two pixels P in a horizontal direction substantially parallel with the gate lines GL. Thus, the pixels P in the first pixel group PG1 and the second pixel group PG2 may alternately connect to the data line DL every two pixels P.

Thus, in the display panel 110 including the pixels P, the pixels P disposed in the horizontal direction substantially parallel with the gate line GL may be inversely driven every two pixels, and the pixels P disposed in a vertical direction substantially parallel with the data line DL may be inversely driven every one pixel.

The data signals applied to the pixels P have a defined polarity pattern, and thus, the pixels may have a defined polarity pattern. The timing control part 200 may determine a defect pattern based on the polarity pattern of the pixels P. For example, the timing control part 200 may determine a pattern of the pixels as the defect pattern when the polarities of the pixels P having an on-state are the same and polarities of the pixels P having an off-state are the same. Alternatively, the timing control part 200 may determine the pattern of the pixels as the defect pattern when polarities of the pixels P adjacent to each other in the horizontal direction substantially parallel with the gate line GL are repeatedly the same in the vertical direction substantially parallel with the data line DL.

When the timing control part 200 determines the pattern of the pixels P as the defect pattern, the timing control part 200 may change at least one of the phase of the data inverse control signal DINV, the logic level of the first polarity control signal POL1, or the logic level of the second polarity control signal POL2.

According to an exemplary embodiment, the timing control part 200 determines the defect pattern based on the polarity pattern of the pixels P, the display panel 100 is driven according to the data inverse control signal DINV, and the first polarity control signal POL1 and the second polarity control signal POL2 are changed by the timing control part 200. As a result, the quality of an image displayed on the display apparatus 100 may be improved.

Figures 6C, 7A:
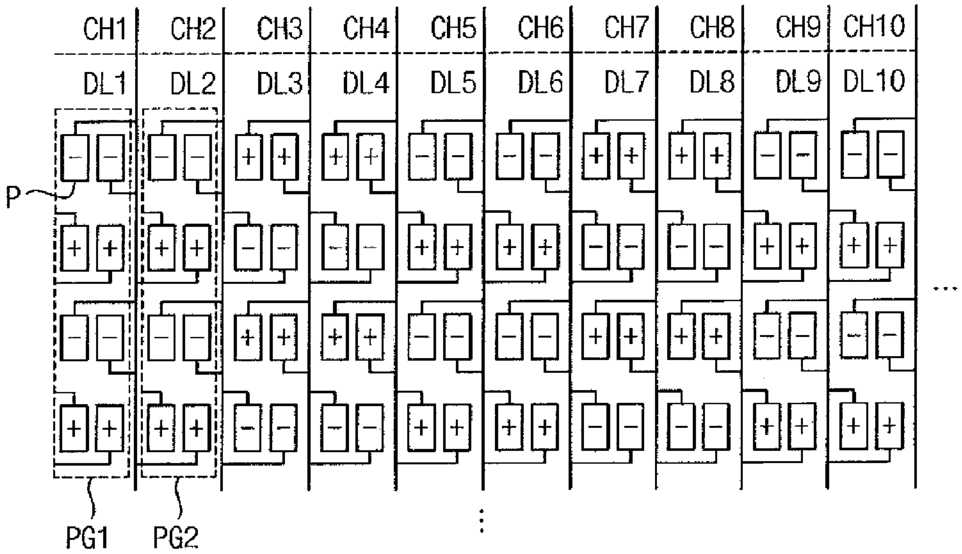

FIGS. 6A and 6B are conceptual views illustrating a method of driving a display panel according to an exemplary embodiment of the present invention. FIG. 6C is a plan view illustrating a display panel driven by the method of FIGS. 6A and 6B, according to an exemplary embodiment of the present invention.

The method of driving the display panel shown in FIGS. 6A and 6B may be processed by the display apparatus 100 described with reference to FIGS. 1 to 3. The same reference numerals may be used to refer to same or like parts as those described with reference to FIGS. 1 to 3.

Referring to FIGS. 1 to 3 and 6A to 6C, the data inverse control signal DINV corresponding to the channels CH1, . . . , CHk in the data driving part 150 has a phase. In an exemplary embodiment, the phase of the data inverse control signal DINV may be inversed every two channels. For example, the data inverse control signal DINV corresponding to the channels CH1, . . . , CHk may have a phase in the order of '(+)(−)(−)(+)(+)(−)(−) . . . ' Thus, the data inverse control signal DINV may alternately have a positive (+) phase and a negative (−) phase every two data lines DL.

The first polarity control signal POL1 determines the polarities of the data signals outputted to the odd-numbered channels among the channels CH1, . . . , CHk. The first polarity control signal POL1 includes a plurality of bits, each bit having a low logic level (0) or a high logic level (1). For example, the first polarity control signal POL1 may be '00110011 . . . '

The second polarity control signal POL2 determines the polarities of the data signals outputted to the even-numbered channels among the channels CH1, . . . , CHk. The second polarity control signal POL2 includes a plurality of bits, each bit having a low logic level (0) or a high logic level (1). For example, the second polarity control signal POL2 may be '11111111 . . . '

As described with reference to FIG. 4, when the data inverse control signal DINV has a positive (+) phase, the data signal may have a negative (−) polarity when the first polarity control signal POL1 has a low logic level (0), and the data signal may have a positive (+) polarity when the first polarity control signal POL1 has a high logic level (1). In addition, when the data inverse control signal DINV has a negative (−) phase, the data signal may have a positive (+) polarity when the first polarity control signal POL1 has a low logic level (0), and the data signal may have a negative (−) polarity when the first polarity control signal POL1 has a high logic level (1).

In addition, when the data inverse control signal DINV has a negative (−) phase, the data signal may have a negative (−) polarity when the second polarity control signal POL2 has a high logic level (1), and when the data inverse control signal DINV has a positive (+) phase, the data signal may have a positive (+) polarity when the second polarity control signal POL2 has a high logic level (1).

Thus, as shown in FIG. 6A, the data signals having '(−)(−)(+)(+)(−)(−)(+)(+) . . . ' polarities are outputted to a first channel CH1 and a fifth channel CH5 among the channels CH1, . . . , CHk, and thus, the data signals having '(−)(−)(+)(+)(−)(−)(+)(+) . . . ' polarities are sequentially applied to the pixels P through a first data line DL1 and a fifth data line DL5 respectively connected to the first channel CH1 and the fifth channel CH5.

In addition, as shown in FIG. 6A, the data signals having '(+)(+)(−)(−)(+)(+)(−)(−) . . . ' polarities are outputted to a third channel CH3 and a seventh channel CH7 among the channels CH1, . . . , CHk, and thus, the data signals having '(+)(+)(−)(−)(+)(+)(−)(−) . . . ' polarities are sequentially applied to the pixels P through a third data line DL3 and a seventh data line DL7 respectively connected to the third channel CH3 and the seventh channel CH7.

In addition, as shown in FIG. 6B, the data signals having '(−)(−)(−)(−)(−)(−)(−)(−) . . . ' polarities are outputted to a second channel CH2 and a sixth channel CH6 among the channels CH1, . . . , CHk, and thus, the data signals having '(−)(−)(−)(−)(−)(−)(−)(−) . . . ' polarities are sequentially applied to the pixels P through a second data line DL2 and a sixth data line DL6 respectively connected to the second channel CH2 and the sixth channel CH6.

In addition, as shown in FIG. 6B, the data signals having '(+)(+)(+)(+)(+)(+)(+)(+) . . . ' polarities are outputted to a fourth channel CH4 among the channels CH1, . . . , CHk, and thus, the data signals having '(+)(+)(+)(+)(+)(+)(+)(+) . . . ' polarities are sequentially applied to the pixels P through a fourth data line DL4 connected to the fourth channel CH4.

As shown in FIG. 6C, the pixels P may include the first pixel group PGI and the second pixel group PG2 disposed at opposing sides with respect to the data line DL and alternately connected to the data line DL. In addition, each of the first pixel group PG1 and the second pixel group PG2 may have two pixels P in the horizontal direction substantially parallel with the gate lines GL. Thus, the pixels P in the first pixel group PG1 and the second pixel group PG2 may alternately connect to the data line DL every two pixels P.

Thus, as shown in FIG. 6C, in the display panel 110 including the pixels P, the pixels P disposed in the horizontal direction substantially parallel with the gate line GL may be inversely driven every four pixels, and the pixels P disposed in the vertical direction substantially parallel with the data line DL may be inversely driven every one pixel.

According to an exemplary embodiment, as shown in FIG. 6C, the display panel 110 is inversely driven every four pixels in the horizontal direction and every one pixel in the vertical direction according to the data inverse control signal DINV, the first polarity control signal POL1, and the second polarity control signal POL2 provided by the timing control part 200. As a result, crosstalk, flicker and a vertical line phenomenon may be decreased, and the quality of an image displayed on the display apparatus 100 may be improved.

Figures 7C, 8A:
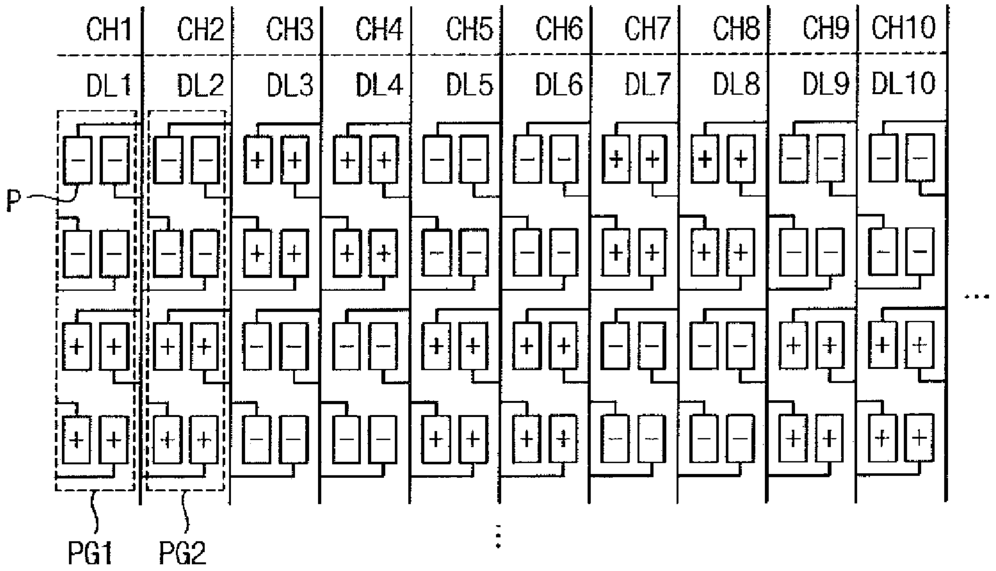
FIG. 7C is a plan view illustrating a display panel driven by the method of FIGS. 7A and 7B, according to an exemplary embodiment of the present invention.
FIGS. 8A and 8B are conceptual views illustrating a method of driving a display panel according to an exemplary embodiment of the present invention.

FIGS. 7A and 7B are conceptual views illustrating a method of driving a display panel, according to an exemplary embodiment of the present invention. FIG. 7C is a plan view illustrating a display panel driven by the method of FIGS. 7A and 7B, according to an exemplary embodiment of the present invention.

The method of driving the display panel illustrated in FIGS. 7A and 7B may be processed by the display apparatus 100 described with reference to FIGS. 1 to 3. Thus, the same reference numerals may be used to refer to same or like parts as those described with reference to FIGS. 1 to 3.

Referring to FIGS. 1 to 3 and 7A to 7C, the data inverse control signal DINV corresponding to the channels CH1, . . . , CHk in the data driving part 150 has a phase. For example, the data inverse control signal DINV corresponding to the channels CH1, . . . , CHk may have a phase in the order of '(+)(−)(−)(+)(+)(−)(−) . . . '

The first polarity control signal POL1 determines the polarities of the data signals outputted to the odd-numbered channels among the channels CH1, . . . , CHk. For example, the first polarity control signal POL1 may be '00001111 . . . '

The second polarity control signal POL2 determines the polarities of the data signals outputted to the even-numbered channels among the channels CH1, . . . , CHk. For example, the second polarity control signal POL2 may be '11000011 . . . '

As described with reference to FIG. 4, when the data inverse control signal DINV has a positive (+) phase, the data signal may have a negative (−) polarity when each of the first polarity control signal POL1 and the second polarity control signal POL2 has a low logic level (0), and the data signal may have a positive (+) polarity when each of the first polarity control signal POL1 and the second polarity control signal POL2 has a high logic level (1).

In addition, when the data inverse control signal DINV has a negative (−) phase, the data signal may have a positive (+) polarity when each of the first polarity control signal POL1 and the second polarity control signal POL2 has a low logic level (0), and the data signal may have a negative (−) polarity when each of the first polarity control signal POL1 and the second polarity control signal POL2 has a high logic level (1).

Thus, as shown in FIG. 7A, the data signals having '(−)(−)(−)(−)(+)(+)(+)(+) . . . ' polarities are outputted to the first channel CH1 and the fifth channel CH5 among the channels CH1, . . . , CHk, and thus, the data signals having '(−)(−)(−)(−)(+)(+)(+)(+) . . . ' polarities are sequentially applied to the pixels P through the first data line DL1 and the fifth data line DL5 respectively connected to the first channel CH1 and the fifth channel CH5.

In addition, as shown in FIG. 7A, the data signals having '(+)(+)(+)(+)(−)(−)(−)(−) . . . ' polarities are outputted to the third channel CH3 and the seventh channel CH7 among the channels CH1, . . . , CHk, and thus, the data signals having '(+)(+)(+)(+)(−)(−)(−)(−) . . . ' polarities are sequentially applied to the pixels P through the third data line DL3 and the seventh data line DL7 respectively connected to the third channel CH3 and the seventh channel CH7.

In addition, as shown in FIG. 7B, the data signals having '(−)(−)(+)(+)(+)(+)(−)(−) . . . ' polarities are outputted to the second channel CH2 and the sixth channel CH6 among the channels CH1, . . . , CHk, and thus, the data signals having '(−)(−)(+)(+)(+)(+)(−)(−) . . . ' polarities are sequentially applied to the pixels P through the second data line DL2 and the sixth data line DL6 respectively connected to the second channel CH2 and the sixth channel CH6.

In addition, as shown in FIG. 7B, the data signals having '(+)(+)(−)(−)(−)(−)(+)(+) . . . ' polarities are outputted to the fourth channel CH4 among the channels CH1, . . . , CHk, and thus, the data signals having '(+)(+)(−)(−)(−)(−)(+)(+) . . . ' polarities are sequentially applied to the pixels P through the fourth data line DL4 connected to the fourth channel CH4.

As shown in FIG. 7C, the pixels P may include the first pixel group PG1 and the second pixel group PG2 disposed at opposing sides with respect to the data line DL and alternately connected to the data line DL. In addition, each of the first pixel group PG1 and the second pixel group PG2 may have two pixels P in the horizontal direction substantially parallel with the gate lines GL. Thus, the pixels P in the first pixel group PG1 and the second pixel group PG2 may alternately connect to the data line DL every two pixels P.

Thus, as shown in FIG. 7C, in the display panel 110 including the pixels P, the pixels P disposed in the horizontal direction substantially parallel with the gate line GL may be inversely driven every four pixels and the pixels P disposed in the vertical direction substantially parallel with the data line DL may be inversely driven every two pixels.

According to an exemplary embodiment, as shown in FIG. 7C, the display panel 110 is inversely driven every four pixels in the horizontal direction and every two pixels in the vertical direction according to the data inverse control signal DINV, the first polarity control signal POL1, and the second polarity control signal POL2 provided by the timing control part 200. As a result, crosstalk, flicker and a vertical line phenomenon may be decreased, and the quality of an image displayed on the display apparatus 100 may be improved.

Figures 8B, 8C:
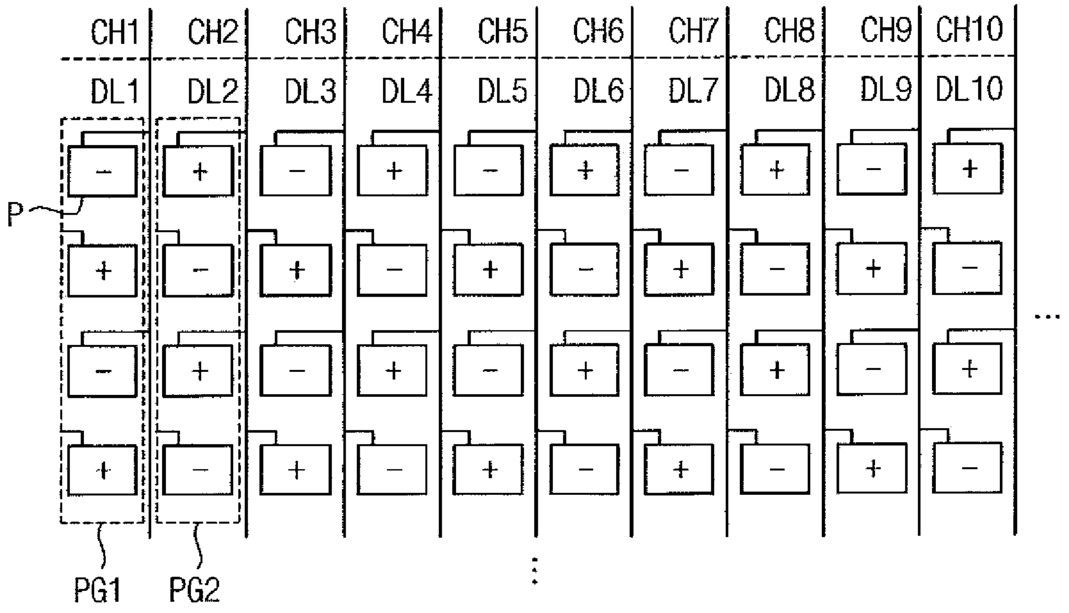
FIG. 8C is a plan view illustrating a display panel driven by the method of FIGS. 8A and 8B, according to an exemplary embodiment of the present invention.

FIGS. 8A and 8B are conceptual views illustrating a method of driving a display panel, according to an exemplary embodiment of the present invention. FIG. 8C is a plan view illustrating a display panel driven by the method of FIGS. 8A and 8B, according to an exemplary embodiment of the present invention.

The method of driving the display panel shown in FIGS. 8A and 8B may be processed by the display apparatus 100 described with reference to FIGS. 1 to 3. The same reference numerals may be used to refer to same or like parts as those described with reference to FIGS. 1 to 3.

Referring to FIGS. 1 to 3 and 8A to 8C, the data inverse control signal DINV corresponding to the channels CH1, . . . , CHk in the data driving part 150 has a phase. For example, the phase of the data inverse control signal DINV may be inversed every channel.

The first polarity control signal POL1 determines the polarities of the data signals outputted to the odd-numbered channels among the channels CH1, . . . , CHk. For example, the first polarity control signal POL1 may be '0000 . . . '

The second polarity control signal POL2 determines the polarities of the data signals outputted to the even-numbered channels among the channels CH1, . . . , CHk. For example, the second polarity control signal POL2 may be '0000 . . . '

As described with reference to FIG. 4, when the data inverse control signal DINV has a positive (+) phase and the first polarity control signal POL1 has a low logic level (0), the data signal may have a negative (−) polarity. In addition, when the data inverse control signal DINV has a negative (−) phase and the second polarity control signal POL2 has a low logic level (0), the data signal may have a positive (+) polarity.

Thus, as shown in FIG. 8A, the data signals having '(−)(−)(−)(−) . . . ' polarities are outputted to the odd-numbered channels among the channels CH1, . . . , CHk, and thus the data signals having '(−)(−)(−)(−) . . . ' polarities are sequentially applied to the pixels P through odd-numbered data lines respectively connected to the odd-numbered channels.

In addition, as shown in FIG. 8B, the data signals having '(+)(+)(+)(+) . . . ' phases are outputted to the even-numbered channels among the channels CH1, . . . , CHk, and thus, the data signals having '(+)(+)(+)(+) . . . ' phases are sequentially applied to the pixels P through even-numbered data lines respectively connected to the even-numbered channels.

As shown in FIG. 8C, the pixels P may include a first pixel group PG1 and a second pixel group PG2 disposed at opposing sides with respect to the data line DL and alternately connected to the data line DL. In addition, each of the first pixel group PGI and the second pixel group PG2 may have one pixel P in the horizontal direction substantially parallel with the gate lines GL. Thus, the pixels P in the first pixel group PG1 and the second pixel group PG2 may alternately connect to the data line DL every pixel P.

Thus, as shown in FIG. 8C, in the display panel 110 including the pixels P, the pixels P disposed in the horizontal direction substantially parallel with the gate line GL may be inversely driven every one pixel, and the pixels P disposed in the vertical direction substantially parallel with the data line DL may be inversely driven every one pixel.

According to an exemplary embodiment, as shown in FIG. 8C, the display panel 110 is inversely driven every one pixel in the horizontal direction and every one pixel in the vertical direction according to the data inverse control signal DINV, the first polarity control signal POL1, and the second polarity control signal POL2 provided by the timing control part 200. As a result, display quality of the display panel 110 may be prevented from deteriorating.

Figure 9:
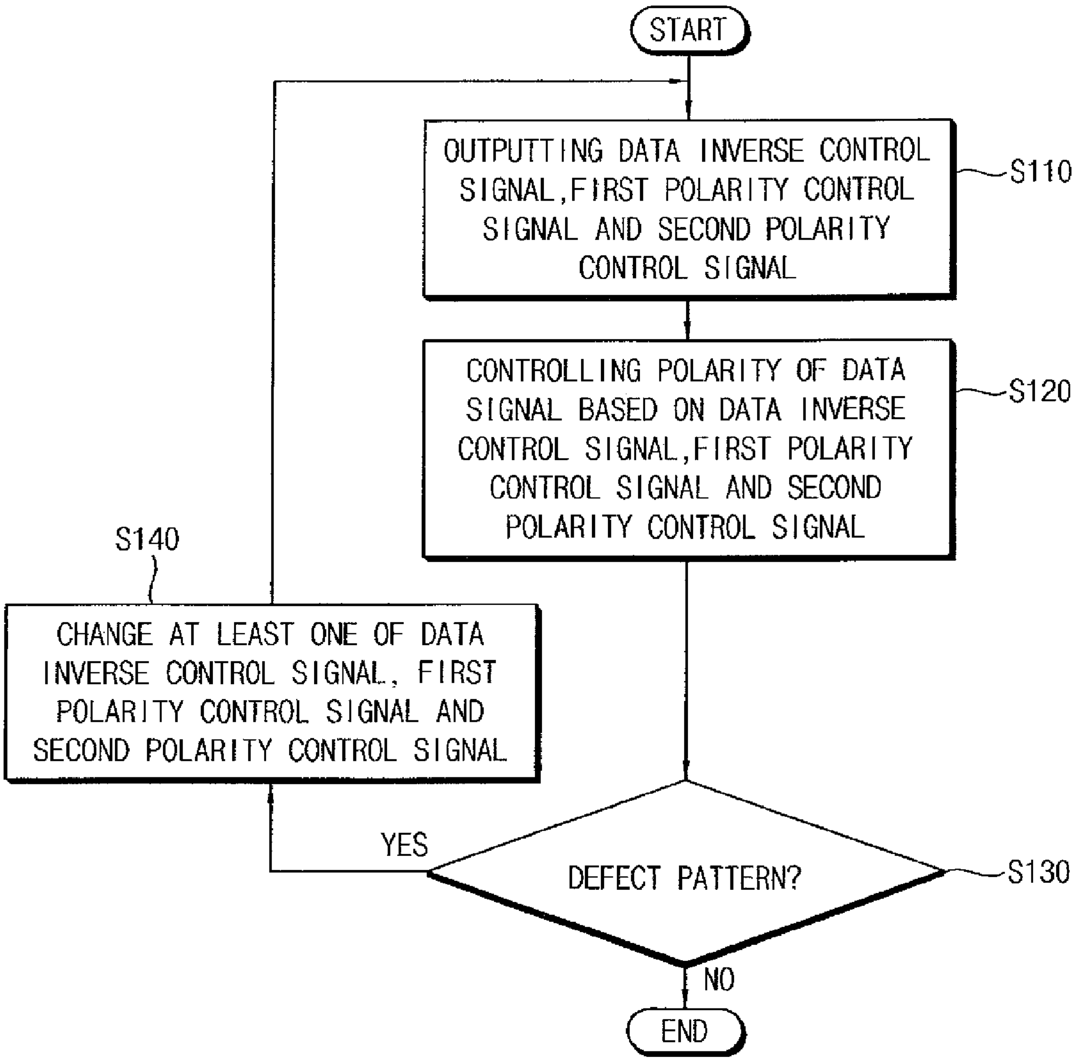
FIG. 9 is a flow chart illustrating a method of driving a display panel according to an exemplary embodiment of the present invention.

FIG. 9 is a flow chart illustrating a method of driving a display panel, according to an exemplary embodiment of the present invention.

The method of driving the display panel of FIG. 9 may be processed by the display apparatus 100 described with reference to FIGS. 1 to 3. The same reference numerals may be used to refer to same or like parts as those described with reference to FIGS. 1 to 3.

Referring to FIGS. 1 to 3 and 9, the timing control part 200 outputs the data inverse control signal DINV, the first polarity control signal POL1, and the second polarity control signal POL2 (block S110). The data inverse control signal DINV has a phase corresponding to every data line DL. Each of the first polarity control signal POL1 and the second polarity control signal POL2 includes bits and controls the polarities of the data signals based on the data inverse control signal DINV.

The data driving part 150 controls the polarities of the data signals based on the data inverse control signal DINV, the first polarity control signal POL1, and the second polarity control signal POL2 provided by the timing control part 200 (block S120). For example, the data driving part 150 may control the polarities of the data signals outputted to the odd-numbered channels based on the data inverse control signal DINV and the first polarity control signal POL1, and may control the polarities of the data signals outputted to the even-numbered channels based on the data inverse control signal DINV and the second polarity control signal POL2. The data driving part 150 applies the data signals with their corresponding polarities to the pixels P.

The timing control part 200 determines a defect pattern based on a polarity pattern of the pixels P (block S130).

When the timing control part 200 determines a polarity pattern of the pixels P as the defect pattern, the timing control part 200 changes at least one of the phase of the data inverse control signal DINV, the logic level of the first polarity control signal POL1, and the logic level of the second polarity control signal POL2 (block S140).

Once the timing control part 200 changes at least one of the data inverse control signal DINV, the first polarity control signal POL1, and the second polarity control signal POL2, blocks S110, S120 and S130 are again processed.

According to an exemplary embodiment, the timing control part 200 determines the defect pattern based on the polarity pattern of the pixels P, the display panel 110 is driven according to the data inverse control signal DINV, the first polarity control signal POL1, and the second polarity control signal POL2, which are changeable by the timing control part 200, and the quality of an image displayed on the display apparatus 100 may be improved.

According to exemplary embodiments of a method of driving a display panel and a display apparatus for performing the method of driving the display panel, a timing control part determines a defect pattern based on a polarity pattern of pixels, and the display panel is driven according to a data inverse control signal, a first polarity control signal, and a second polarity control signal, which are changeable by the timing control part. As a result, crosstalk, flicker and a vertical line phenomenon displayed by the display panel may be decreased, and the quality of an image displayed by the display apparatus may be improved.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display apparatus, comprising:

a display panel comprising a plurality of gate lines extending in a first direction, a plurality of data lines extending in a second direction crossing the first direction, a first pixel group, and a second pixel group, wherein the first and second pixel groups are disposed at opposing sides of one of the data lines and are alternately connected to the one of the data lines;

a gate driving part configured to output a gate signal to the gate lines;

a data driving part comprising a plurality of channels electrically connected to the data lines, wherein the plurality of channels are configured to output a data signal to the data lines, the data signal has a first polarity or a second polarity, and the second polarity has an inversed phase to the first polarity with respect to a reference voltage; and a timing control part configured to output a data inverse control signal, a first polarity control signal, and a second polarity control signal, wherein the first and second polarity control signals control the polarity of the data signal based on the data inverse control signal, wherein the first polarity control signal controls a polarity of the data signal corresponding to an odd-numbered channel of the data driving part based on a phase of the data inverse control signal, and the second polarity control signal controls a polarity of the data signal corresponding to an even-numbered channel of the data driving part based on the phase of the data inverse control signal, wherein the first polarity control signal, the second polarity control signal and the data inverse control signal are different signals.

2. The display apparatus of claim 1, wherein the data inverse control signal has a phase corresponding to each data line.

3. The display apparatus of claim 2, wherein the data driving part comprises:

a first polarity controller configured to control the polarity of the data signal outputted to the odd-numbered channel of the data driving part based on the phase of the data inverse control signal and a logic level of the first polarity control signal; and a second polarity controller configured to control the polarity of the data signal outputted to the even-numbered channel of the data driving part based on the phase of the data inverse control signal and a logic level of the second polarity control signal.

4. The display apparatus of claim 2, wherein the phase of the data inverse control signal is inversed every data line.

5. The display apparatus of claim 3, wherein the first and second polarity controllers are configured to set the polarity of the data signal to a first polarity upon determining that the logic level of the first polarity control signal and the logic level of the second polarity control signal are a first logic level, and the data inverse control signal has a first phase, and set the polarity of the data signal to a second polarity different from the first polarity upon determining that the logic level of the first polarity control signal and the logic level of the second polarity control signal are a second logic level, and the data inverse control signal has the first phase.

6. The display apparatus of claim 5, wherein the first and second polarity controllers are configured to set the polarity of the data signal to the second polarity upon determining that the logic level of the first polarity control signal and the logic level of the second polarity control signal are the first logic level, and the data inverse control signal has a second phase different from the first phase, and set the polarity of the data signal to the first polarity upon determining that the logic level of the first polarity control signal and the logic level of the second polarity control signal are the second logic level, and the data inverse control signal has the second phase.

7. The display apparatus of claim 6, wherein the first phase is a positive phase, the second phase is a negative phase, the first logic level is a low logic level, the second logic level is a high logic level, the first polarity is a negative polarity, and the second polarity is a positive polarity.

8. The display apparatus of claim 1, wherein each of the first polarity control signal and the second polarity control signal comprises a plurality of bits.

9. The display apparatus of claim 1, wherein the phase of the data inverse control signal is inversed every two data lines.

10. The display apparatus of claim 1, wherein the first and second pixel groups comprise pixels disposed in a horizontal direction substantially parallel with the gate lines and pixels disposed in a vertical direction substantially parallel with the data lines, wherein the pixels disposed in the horizontal direction are inversely driven every four pixels, and the pixels disposed in the vertical direction are inversely driven every one pixel.

11. The display apparatus of claim 1, wherein the first and second pixel groups comprise pixels disposed in a horizontal direction substantially parallel with the gate lines and pixels disposed in a vertical direction substantially parallel with the data lines, wherein the pixels disposed in the horizontal direction are inversely driven every four pixels, and the pixels disposed in the vertical direction are inversely driven every two pixels.

12. The display apparatus of claim 1, wherein each of the first pixel group and the second pixel group comprises two pixels arranged in a horizontal direction substantially parallel with the gate lines.

13. The display apparatus of claim 1, wherein each of the first pixel group and the second pixel group comprises one pixel.

14. The display apparatus of claim 1, wherein the timing control part is configured to determine a defect pattern based on a polarity pattern of pixels of the first and second pixel groups.

15. The display apparatus of claim 14, wherein the defect pattern comprises a pattern of pixels having polarities in an on-state that are substantially similar to polarities of the pixels in an off-state.

16. The display apparatus of claim 14, wherein a pattern of the pixels is determined to be the defect pattern by the timing control part upon determining that polarities of pixels adjacent to each other in a direction substantially parallel with the gate lines are substantially similar to polarities of pixels adjacent to each other in a direction substantially parallel with the data lines.

17. The display apparatus of claim 14, wherein the defect pattern comprises the polarity pattern of the pixels, and the timing control part is configured to change at least one of the phase of the data inverse control signal, the logic level of the first polarity control signal, or the logic level of the second polarity control signal.

18. A method of driving a display panel, comprising:

outputting a data inverse control signal, a first polarity control signal, and a second polarity control signal to a data driving part of a display apparatus, wherein the first and second polarity control signals are based on the data inverse control signal, the first polarity control signal controls a polarity of a data signal corresponding to an odd-numbered channel of the data driving part, and the second polarity control signal controls a polarity of the data signal corresponding to an even-numbered channel of the data driving part; and outputting the data signal to a data line of the display apparatus based on the data inverse control signal, the first polarity control signal and the second polarity control signal, wherein the data signal has a first polarity or a second polarity, and the second polarity has an inversed phase to the first polarity with respect to a reference voltage, wherein the first polarity control signal, the second polarity control signal and the data inverse control signal are different signals.

19. The method of claim 18, wherein outputting the data signal comprises:

controlling the polarity of the data signal outputted to the odd-numbered channel of the data driving part, wherein the data signal outputted to the odd-numbered channel is based on the phase of the data inverse control signal and a logic level of the first polarity control signal; and controlling the polarity of the data signal outputted to the even-numbered channel of the data driving part, wherein the data signal outputted to the even-numbered channel is based on the phase of the data inverse control signal and a logic level of the second polarity control signal.

20. The method of claim 18, further comprising:

determining a defect pattern based on a polarity pattern of a plurality of pixels in the display panel.

21. The method of claim 20, further comprising:

changing at least one of the phase of the data inverse control signal, the logic level of the first polarity control signal, or the logic level of the second polarity control signal, upon determining the defect pattern.

22. A display apparatus, comprising:

a timing control part configured to output a data inverse control signal, a first polarity control signal, and a second polarity control signal; and a data driving part configured to receive the data inverse control signal, the first polarity control signal, and the second polarity control signal, and output a data signal to a plurality of data lines in the display apparatus, wherein the first and second polarity control signals control the polarity of the data signal based on the data inverse control signal, wherein the first polarity control signal controls a polarity of the data signal corresponding to an odd-numbered channel of the data driving part based on a phase of the data inverse control signal, and the second polarity control signal controls a polarity of the data signal corresponding to an even-numbered channel of the data driving part based on the phase of the data inverse control signal, wherein the first polarity control signal, the second polarity control signal and the data inverse control signal are different signals.

23. The display apparatus of claim 22, wherein the data driving part comprises:

a plurality of channels electrically connected to the data lines and configured to output the data signal to the data lines, wherein the data signal has a first polarity or a second polarity, and the second polarity has an inversed phase to the first polarity with respect to a reference voltage; and a polarity control part configured to receive the data inverse control signal, the first polarity control signal, and the second polarity control signal, wherein the data inverse control signal has a phase corresponding to each data line.

24. The display apparatus of claim 23, wherein the polarity control part comprises:

a first polarity controller configured to control the polarity of the data signal outputted to the odd-numbered channel of the data driving part based on a phase of the data inverse control signal and a logic level of the first polarity control signal; and a second polarity controller configured to control the polarity of the data signal outputted to the even-numbered channel of the data driving part based on a phase of the data inverse control signal and a logic level of the second polarity control signal.

* * * * *